United States Patent
Lu et al.

(10) Patent No.: US 10,325,421 B2
(45) Date of Patent: Jun. 18, 2019

(54) SYSTEMS AND METHODS FOR AIRCRAFT MESSAGE MONITORING

(71) Applicant: The Boeing Company, Chicago, IL (US)

(72) Inventors: Tsai-Ching Lu, Thousand Oaks, CA (US); Nigel Stepp, Santa Monica, CA (US); Franz David Betz, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 174 days.

(21) Appl. No.: 15/332,479

(22) Filed: Oct. 24, 2016

(65) Prior Publication Data

US 2018/0114376 A1    Apr. 26, 2018

(51) Int. Cl.
*G07C 5/00* (2006.01)
*B64D 45/00* (2006.01)
(Continued)

(52) U.S. Cl.
CPC .............. *G07C 5/008* (2013.01); *B64D 45/00* (2013.01); *G05B 23/0272* (2013.01);
(Continued)

(58) Field of Classification Search
CPC ............ B64D 45/00; B64D 2045/0085; G05B 23/0272; G05B 23/0281; G07C 5/008; G07C 5/0808
See application file for complete search history.

(56) References Cited

U.S. PATENT DOCUMENTS 4,943,919 A * 7/1990 Aslin ..................... G07C 5/006
340/500
6,829,527 B2 12/2004 Felke et al.
(Continued)

FOREIGN PATENT DOCUMENTS

EP          2254016 A2    11/2010
WO     2015107317 A1     7/2015

OTHER PUBLICATIONS

EP Partial Search Report for related application 17197112.0 dated Jun. 5, 2018; 15 pp.
(Continued)

*Primary Examiner* — Rachid Bendidi
(74) *Attorney, Agent, or Firm* — Armstrong Teasdale LLP (57) ABSTRACT

A system for monitoring aircraft operational messages is provided. The system includes a computing device including a processor in communication with a memory. The computing device is programmed to receive a plurality of historical messages for a plurality of aircraft. Each message of the plurality of historical messages is a message from one of the plurality of aircraft. The computing device is also programmed to receive a plurality of historical maintenance operations performed on the plurality of aircraft, compare the plurality of historical messages to the plurality of historical maintenance operations to determine at least one message type associated with at least one maintenance operation type, and generate a plurality of message type correlations between message types and maintenance operation types based on the comparison.

20 Claims, 7 Drawing Sheets

(51) Int. Cl.
*G07C 5/08* (2006.01)
*G05B 23/02* (2006.01)

(52) U.S. Cl.
CPC ....... *G05B 23/0281* (2013.01); *G07C 5/0808* (2013.01); *G07C 5/0825* (2013.01); *B64D 2045/0085* (2013.01)

(56) References Cited

U.S. PATENT DOCUMENTS

| | | | |
|---|---|---|---|
| 7,230,527 B2 | 6/2007 | Basu et al. | |
| 8,452,475 B1 | 5/2013 | West et al. | |
| 9,251,502 B2 | 2/2016 | Schoonveld | |
| 9,325,793 B1 | 4/2016 | Stone et al. | |
| 2003/0046382 A1 | 3/2003 | Nick | |
| 2007/0288414 A1 | 12/2007 | Barajas et al. | |
| 2008/0040152 A1* | 2/2008 | Vian | G05B 23/0221 705/2 |
| 2010/0156654 A1 | 6/2010 | Bullemer et al. | |
| 2013/0079972 A1* | 3/2013 | Lake | G07C 5/0808 701/31.6 |
| 2013/0304420 A1* | 11/2013 | Laval | G05B 23/0272 702/184 |
| 2014/0075506 A1 | 3/2014 | Davis et al. | |
| 2015/0039177 A1* | 2/2015 | Chapman | G07C 5/008 701/31.6 |
| 2015/0169200 A1* | 6/2015 | Nicosia | G06F 17/30017 715/747 |
| 2016/0016671 A1 | 1/2016 | Fournier et al. | |
| 2016/0189440 A1 | 6/2016 | Cattone | |

OTHER PUBLICATIONS

Chidambaram, Bala et al.; "Recorders, Reasoners and Artificial Intelligence—Integrated Diagnostics on Military Transport Aircraft"; 2006 IEEE Aerospace Conference, Big Sky, Montana; Mar. 4, 2006; pp. 1-9.

EPO Extended Search Report for related application 17197112.0 dated Sep. 14, 2018; 19 pp.

* cited by examiner

SYSTEMS AND METHODS FOR AIRCRAFT MESSAGE MONITORING

BACKGROUND

The field of the present disclosure relates generally to monitoring aircraft operational messages, and, more specifically, to determining the relevancy of aircraft operational messages to the safe operation of an aircraft.

Aircraft contain multiple redundant systems that allow the aircraft to operate safely even if certain systems are not functioning properly or are disabled. Aircraft manufacturers and airlines keep minimum equipment lists (MELs). These are lists of the minimum amount of equipment that must be operating for an aircraft to be allowed to operate in different areas. For example, the MEL to fly in the continental U.S. is different than the MEL required to fly to an international destination.

If a piece of equipment begins to malfunction, such as a radio, the flight crew or a maintenance crew may disable the malfunctioning equipment. In some cases, the crew may pull the breaker connecting the malfunctioning equipment. After the malfunctioning equipment is disconnected, this action is logged. The aircraft would then detect this disconnection and transmit error messages. As the aircraft can send hundreds of messages on a regular basis, determining which messages are important and which can be safely ignored can be a time consuming task. Many attempts to analyze aircraft message traffic have failed in the past due to the large number of messages involved and the potential for false correlations.

BRIEF DESCRIPTION

In one aspect, a system for monitoring aircraft operational messages is provided. The system includes a computing device including a processor in communication with a memory. The computing device is programmed to receive a plurality of historical messages for a plurality of aircraft. Each message of the plurality of historical messages is a message from one of the plurality of aircraft. The computing device is also programmed to receive a plurality of historical maintenance operations performed on the plurality of aircraft, compare the plurality of historical messages to the plurality of historical maintenance operations to determine at least one message type associated with at least one maintenance operation type, and generate a plurality of message type correlations between message types and maintenance operation types based on the comparison.

In another aspect, an aircraft message monitor (AMM) computer device for monitoring aircraft operational messages is provided. The AMM computer device includes a processor in communication with a memory. The processor is programmed to receive a plurality of historical messages for a plurality of aircraft. Each message of the plurality of historical messages is a message from one of the plurality of aircraft. The processor is also programmed to receive a plurality of historical maintenance operations performed on the plurality of aircraft, compare the plurality of historical messages to the plurality of historical maintenance operations to determine at least one message type associated with at least one maintenance operation type, and generate a plurality of message type correlations between message types and maintenance operation types based on the comparison.

In yet another aspect, a system for monitoring aircraft operational messages is provided. The system includes a computing device that includes a processor in communication with a memory. The computing device is programmed to store a plurality of correlations of message types based on a plurality of historical message data from a plurality of aircraft, receive a plurality of messages from at least one aircraft, compare the plurality of messages to the plurality of message type correlations, filter a subset of messages from the plurality of messages based on the comparison, and determine at least one trend based on the remaining messages.

DETAILED DESCRIPTION

The implementations described herein relate to monitoring aircraft operational messages, and, more specifically, to determining the relevancy of aircraft operational messages to the safe operation of an aircraft. More specifically, an aircraft message monitor ("AMM") computer device (also known as an AMM server) collates historical message traffic to determine correlations between message types and other non-mission critical factors, such as when not all of the components of the aircraft are in operation, but the aircraft still meets the required minimum equipment list. The AMM computer device uses those correlations to filter out the non-mission critical messages to improve the analysis of the remaining messages.

In an example embodiment, the AMM server receives a plurality of historical messages from a plurality of aircraft. In the example embodiment, the plurality of historical messages are messages that have been transmitted from the plurality of aircraft to a ground station. In this embodiment, the ground station receives messages from the plurality of aircraft over time. The ground station stores the messages in a database. The ground station then transmits the plurality of stored messages to the AMM server. In the some embodiments, the plurality of messages are from a plurality of aircraft and the messages were generated by sensors in the aircraft during a plurality of flights. For example, the plurality of messages may be for all flights of a particular type of aircraft for a period of a year or multiple years. The plurality of messages may be for all aircraft flights associated with an individual airline over a period of time, such as months or years.

In the example embodiment, the AMM server receives a plurality of historical maintenance operations performed on the plurality of aircraft. The plurality of historical maintenance operations includes information such as when a component of an aircraft was disconnected. In the example embodiment, the historical maintenance operations map to the various aircraft whose messages are included in the plurality of historical messages. In one embodiment, the AMM server receives a plurality of historical messages for a specific aircraft and receives the historical maintenance operations that were performed on that aircraft. In the example embodiment, the AMM server receives the historical message and the historical maintenance operations for a plurality of aircraft, such as for an aircraft fleet. In some further embodiments, the AMM server receives additional information about each aircraft, such as, but not limited to, aircraft type, hours of operation, locations flown, and other information about the operation of the aircraft.

In the example embodiment, the AMM server compares the plurality of historical messages with the plurality of historical maintenance operations to determine at least one message type associated with at least one maintenance operation type. For example, the AMM server may determine that there is a correlation between a maintenance operation to disconnect a radio and two messages. In this example, after a radio is disconnected, the AMM server may determine that a radio unavailable message is repeatedly sent out. The AMM server may also determine that a message stating that 20 Volts is not available to the radio is also repeatedly sent out.

In at least one embodiment, the AMM server calculates a correlation between the maintenance operation and having messages of one or more types being sent out. In some embodiments, the AMM server analyzes at each maintenance operation type. The AMM server analyzes the messages that occur before and after each maintenance operation type for each of the plurality of messages. For example, if forty aircraft performed a specific type of maintenance operation, the AMM server compares the messages that were transmitted for each of the forty aircraft before and after the maintenance operation. If there is a correlation of either a message no longer appearing after the operation or a new message that appears after the operation, then the AMM server calculates the correlation, namely, the mathematical probability that there is a correlation between the maintenance operation and the change in messages. The higher the correlation, the more likely that the maintenance operation affected the messages. The AMM server calculates a confidence level for the correlation. For example, if there are only a few aircraft with the maintenance operation and the correlation is low, then the confidence level may be low. If the confidence level exceeds a threshold, then the AMM server associates the messages (or message type) with the maintenance operation.

In the example embodiment, the AMM server generates a plurality of message type correlations, between message types and maintenance operation types. The AMM server stores each correlation that exceeds a confidence threshold. In the example embodiment, the AMM server stores the correlations in a database.

In some embodiments, the AMM server compares the aircraft type to the plurality of historical messages. In these embodiments, the AMM server determines if there is a correlation between a message type and an aircraft type. For example, a specific aircraft type may have a status message or other non-critical message that aircraft of its type consistently generate. In these embodiments, the AMM server determines a confidence level about the correlation and associates the message type with the aircraft type if the confidence level exceeds the threshold.

In some further embodiments, the AMM server receives a plurality of messages from a single aircraft. The AMM server analyzes the plurality of messages to determine at least one maintenance operation that has been performed on the aircraft based on the plurality of messages and the plurality of message type correlations. For example, the AMM server may see messages of message type A and message type B and have a 99% confidence that maintenance operation type X had been performed on the aircraft due to see these two message types in the plurality of messages that the aircraft generated.

In some still further embodiments, the AMM server filters out a subset of messages from the plurality of messages, where the subset of messages are correlated to the determine maintenance operation. In the above example, the AMM server would remove or filter out messages of message type A and message type B from the plurality of messages from the aircraft 100. After removing the messages, the AMM server analyzes the remaining messages to determine at least one trend about operation of the aircraft. By removing the messages associated with the known maintenance operation, the AMM server is then able to analyze a reduced message set. As the reason for those messages being generated becomes known, reducing the messages in the plurality of messages reduces the amount of noise and improves the accuracy of the determined trend. An example of a trend may be a correlation between one or more message types and a later component failure.

Furthermore, removing messages that have known correlations to non-mission critical or safety reasons for being generated reduces the chance that a false correlation may be determined.

Described herein are computer systems such as the AAM computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

Figure 1:
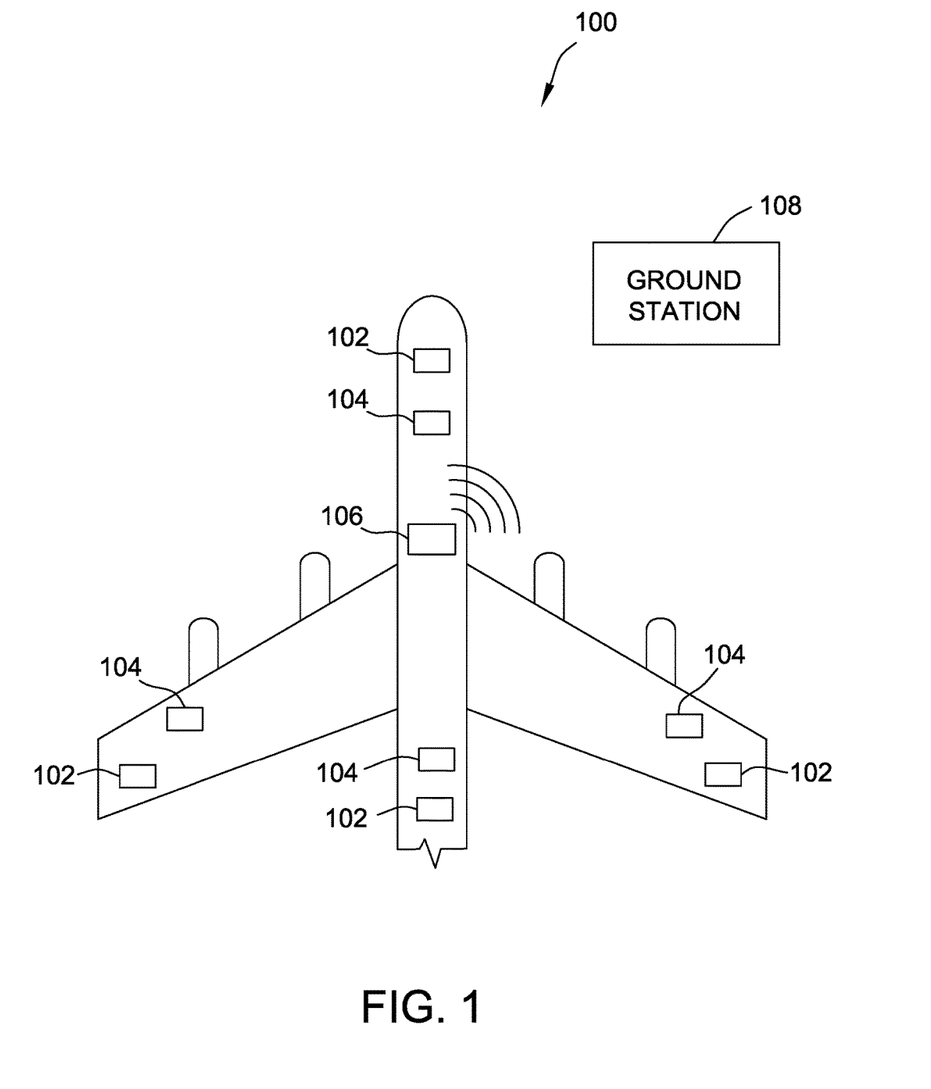
FIG. 1 illustrates a block diagram of an overview of an example aircraft in accordance with one embodiment of the present disclosure.

FIG. 1 illustrates a block diagram of an overview of an example aircraft 100 in accordance with one embodiment of the present disclosure. In the example embodiment, aircraft 100 includes a plurality of components 102. Many of these components 102 may be disconnected and still allow aircraft 100 to operate safely. Many of these components 102 have one or more backup components 102 that duplicate the functionality of their corresponding component. In the example embodiment, a pilot or other crew member (not shown) may disconnect one of the components 102 if the component 102 is malfunctioning.

Aircraft 100 also includes a plurality of sensors 104 that ensure the safe operation of aircraft 100. Sensors 104 are configured to detect when conditions are different from what are expected and transmit messages based on those conditions. For example, if a radio component 102 is disconnected, sensors 104 detect that the radio is not functioning and transmit a message that the radio is not functioning. Sensors 104 may also detect that there is not enough power to the radio (as it is disconnected) and transmit a message about the lack of power to the radio. Sensors 104 may repeatedly transmit these messages on a regular basis. Other example messages that are not mission critical may include, but are not limited to, printer is out of paper, coffee maker needs a filter change, etc. In some embodiments, sensors 104 may transmit regular messages based on the aircraft type.

In the example embodiment, aircraft 100 includes a transmitter 106. Transmitter 106 transmits the messages generated by sensors 104 to a ground station 108. In the example embodiment, ground station 108 stores all of the messages received from aircraft 100 for future analysis. In other embodiments, ground station 108 may scan the received messages for specific messages that may indicate a serious problem. In some embodiments, ground station 108 is associated with an airline that includes a plurality of aircraft 100. In these embodiments, ground station 108 may receive and store messages from a plurality of aircraft 100. In other embodiments, ground station 108 may be associated with an aircraft manufacturer and receive and store messages for aircraft 100 manufactured by that manufacturer.

Figure 2:
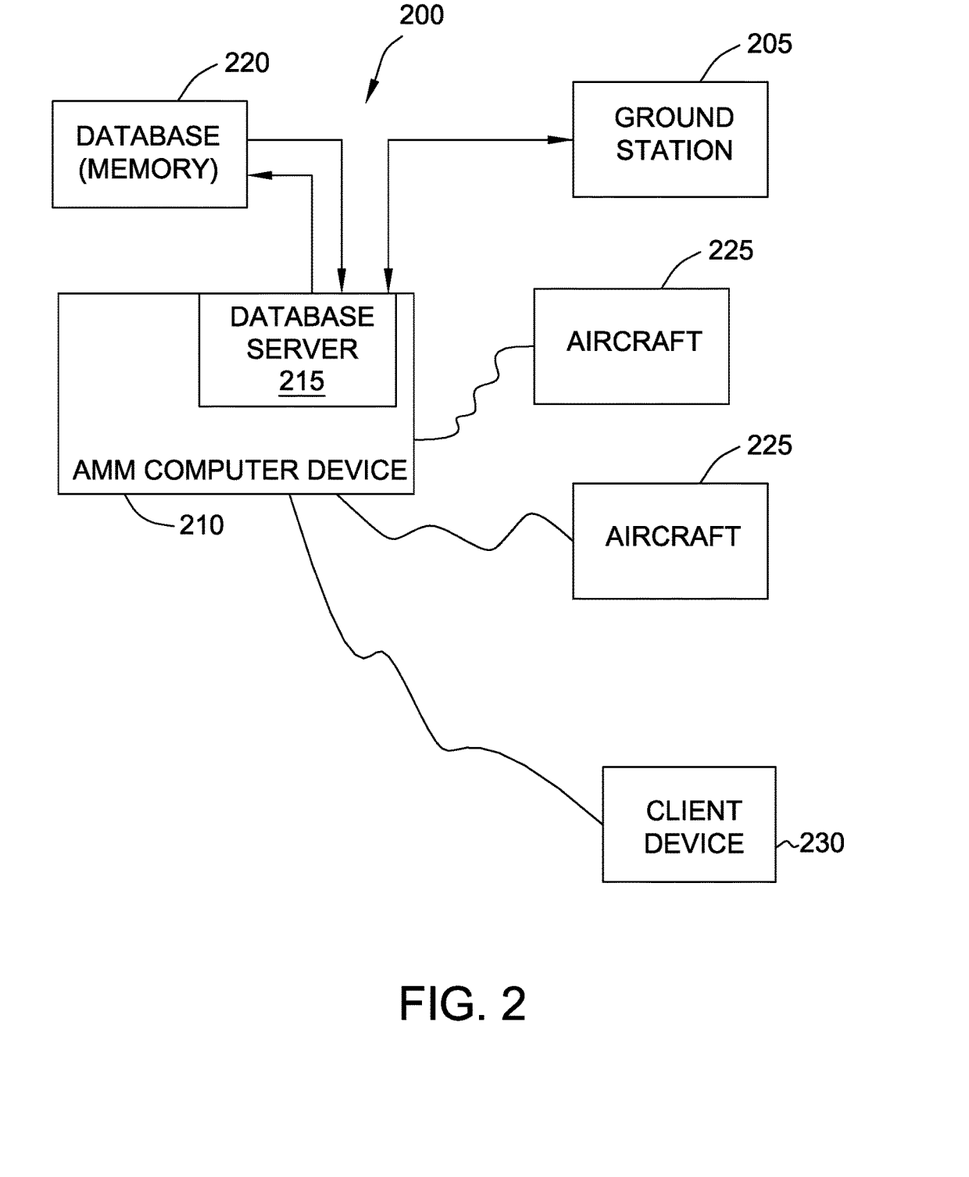
FIG. 2 is a simplified block diagram of an example system for monitoring aircraft operational messages such as from the aircraft shown in FIG. 1.

FIG. 2 is a simplified block diagram of an example system 200 for monitoring aircraft operational messages such as from aircraft 100 (shown in FIG. 1). In the example embodiment, system 200 is used for collecting, monitoring, and analyzing conditions in aircraft 100. In addition, system 200 is a monitoring system that includes an aircraft message monitor (AMM) computer device 210 (also known as an AMM server) configured to monitor aircraft 100. As described below in more detail, AMM server 210 is configured to receive a plurality of historical messages from a plurality of aircraft 225. Each message of the plurality of historical messages is a message from one of the plurality of aircraft 225. The AMM server 210 is also configured to receive a plurality of historical maintenance operations performed on the plurality of aircraft 225, compare the plurality of historical messages to the plurality of historical maintenance operations to determine at least one message type associated with at least one maintenance operation type, and generate a plurality of message type correlations between message types and maintenance operation types based on the comparison. As also described below, AMM server 210 is also configured to store a plurality of correlations of message types based on a plurality of historical message data from a plurality of aircraft 225, receive a plurality of messages from at least one aircraft 100, compare the plurality of messages to the plurality of message type correlations, filter a subset of messages from the plurality of messages based on the comparison, and determine at least one trend based on the remaining messages.

In the example embodiment, aircraft 225 are similar to aircraft 100. In some embodiments, aircraft 225 transmit messages to AMM server 210. In some of these embodiments, aircraft 225 transmit messages as they occur. In other embodiments, aircraft 225 transmit the messages in batches, such as when aircraft 225 is at the gate. Aircraft 225 include a software application, which enables aircraft 225 to communicate with AMM server 210 via cellular connection, satellite communications, the Internet, or a Wide Area Network (WLAN). In some embodiments, aircraft 225 are communicatively coupled to AMM server 210 through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Examples of aircraft 225 may include, but are not limited to, passenger aircraft, cargo aircraft, and unmanned aircraft.

A database server 215 is communicatively coupled to a database 220 that stores data. In one embodiment, database 220 is a database that includes thresholds, sensor data, warning data, and alert data. In the example embodiment, database 220 is stored remotely from AMM server 210. In some embodiments, database 220 is decentralized. In some embodiments, database 220 is centralized. In the example embodiment, a user can access database 220 via a client system 230 by logging onto AMM server 210. In some embodiments, database 220 includes a single database having separated sections or partitions or in other embodiments, database 220 includes multiple databases, each being separate from each other. Database 220 stores correlations, aircraft data, message data, and trends.

In the example embodiment, client systems 230 are computers that include a web browser or a software application, which enables client systems 230 to communicate with AMM server 210 via cellular communication, satellite communication, the Internet, or a Wide Area Network (WLAN). In some embodiments, client systems 230 are communicatively coupled to AMM server 210 through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 230 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment.

In the some embodiments, AMM server 210 is communicatively coupled with a plurality of aircraft 225. In other embodiments, AMM server 210 is communicatively coupled with one or more ground stations 205. In these embodiments, ground station 205 acts as a gateway between the plurality of aircraft 225 and AMM server 210. In some embodiments, ground station 205 is ground station 108, shown in FIG. 1. In the example embodiment, ground station 205 is configured to communicate with a plurality of aircraft 225. In some embodiments, aircraft 225 transmit messages to ground station 205. In some of these embodiments, ground station 205 receives messages as they occur. In other embodiments, ground station 205 receives the messages in batches, such as when aircraft 225 is at the gate. Ground station 205 includes a software application, which enables ground station 205 to communicate with AMM server 210 via cellular connection, satellite communications, the Internet, or a Wide Area Network (WLAN). In some embodiments, ground station 205 is communicatively coupled to AMM server 210 through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem.

In the example embodiment, ground station 205 is associated with a plurality of aircraft 225. For example, ground station 205 is associated with the airline associated with the plurality of aircraft 225. In other embodiments, ground station 205 is associated with the manufacturer of the plurality of aircraft 225. In the example embodiment, ground station 205 is configured to receive a plurality of messages from each of aircraft 225 that it is in communication with. Ground station 205 is also configured to communicate the plurality of messages to AMM server 210. The messages may be transmitted individually or in batches.

Figure 3:
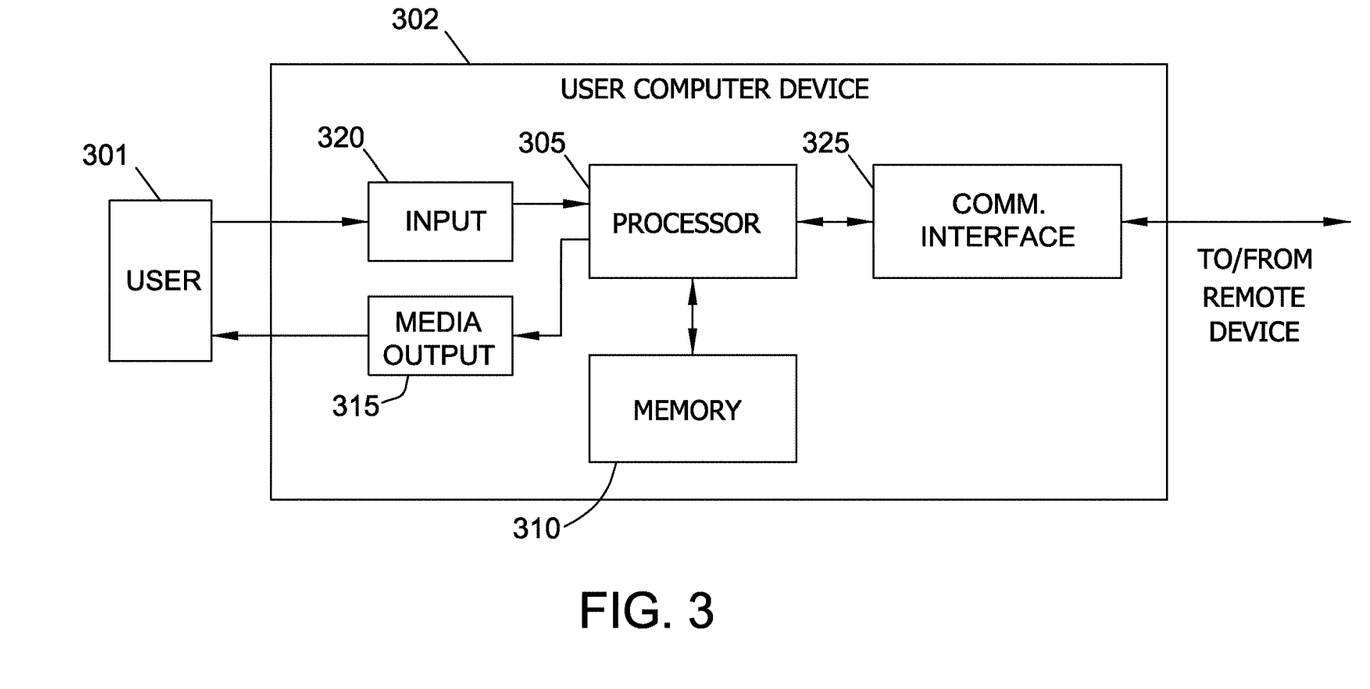
FIG. 3 illustrates an example configuration of the client computer device shown in FIG. 2, in accordance with one embodiment of the present disclosure.

FIG. 3 illustrates an example configuration of a client system, in accordance with one embodiment of the present disclosure. User computer device 302 is operated by a user 301. User computer device 302 may include, but is not limited to, aircraft 225, client system 230, and ground station 205 (all shown in FIG. 2). User computer device 302 includes a processor 305 for executing instructions. In some embodiments, executable instructions are stored in a memory 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. In some embodiments, user computer device 302 includes an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as AMM server 210 (shown in FIG. 2). Communication interface 325 may also be in communication with transmitter 106 in aircraft 100 (both shown in FIG. 1), where user computer device 302 provides receives data from aircraft 100. Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page, a website, or program from AMM server 210. A client application allows user 301 to interact with, for example, AMM server 210. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed.

Figure 4:
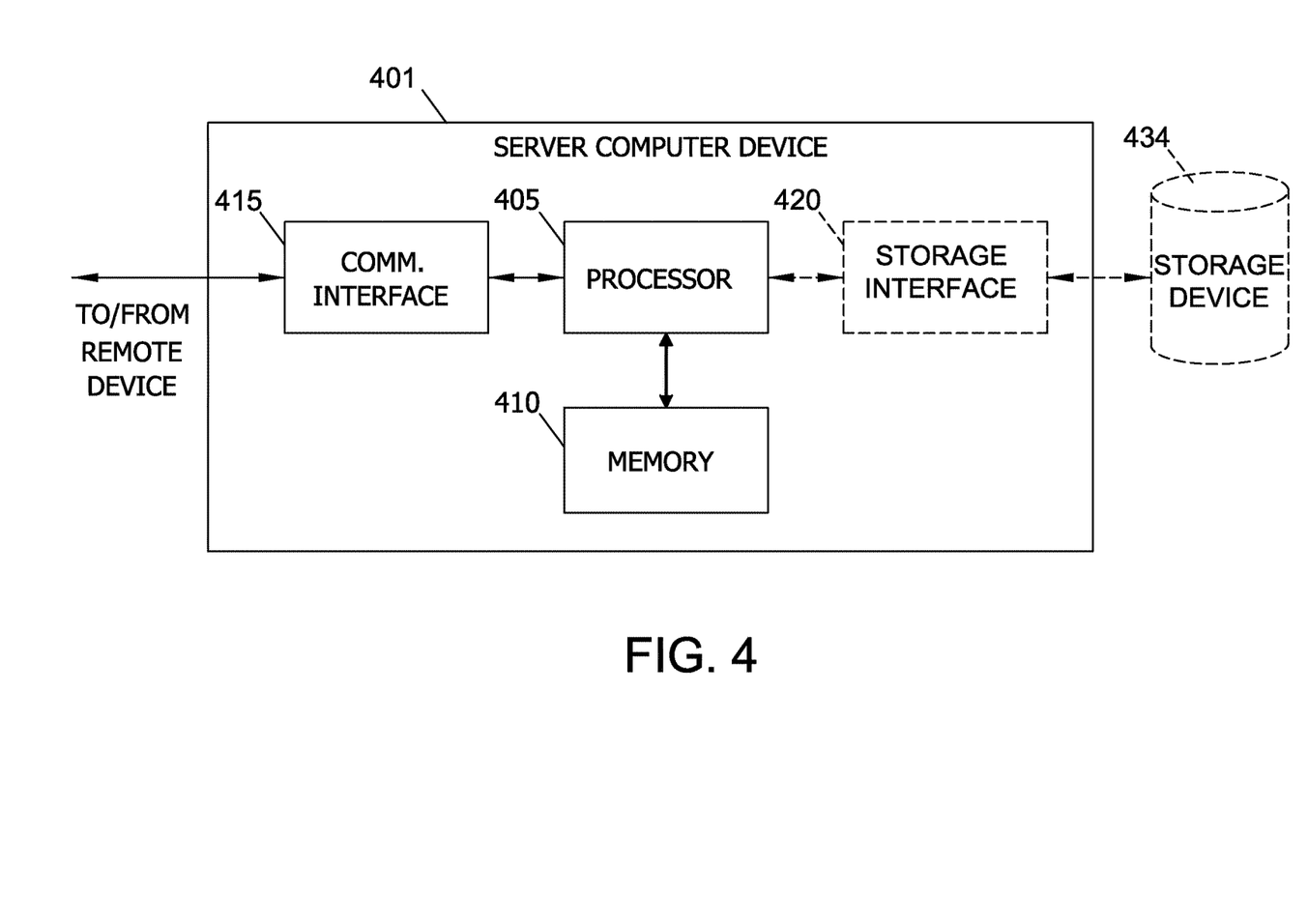
FIG. 4 illustrates an example configuration of the server system shown in FIG. 2, in accordance with one embodiment of the present disclosure.

FIG. 4 illustrates an example configuration of server system 210 shown in FIG. 2, in accordance with one embodiment of the present disclosure. Server computer device 401 may include, but is not limited to, database server 215, AMM server 210, and ground station 205 (all shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, another AMM server 210, ground station 205, client system 230, or aircraft (both shown in FIG. 2). For example, communication interface 415 may receive message from ground station 205 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 is programmed with the instructions such as illustrated in FIGS. 5 and 6.

Figure 5:
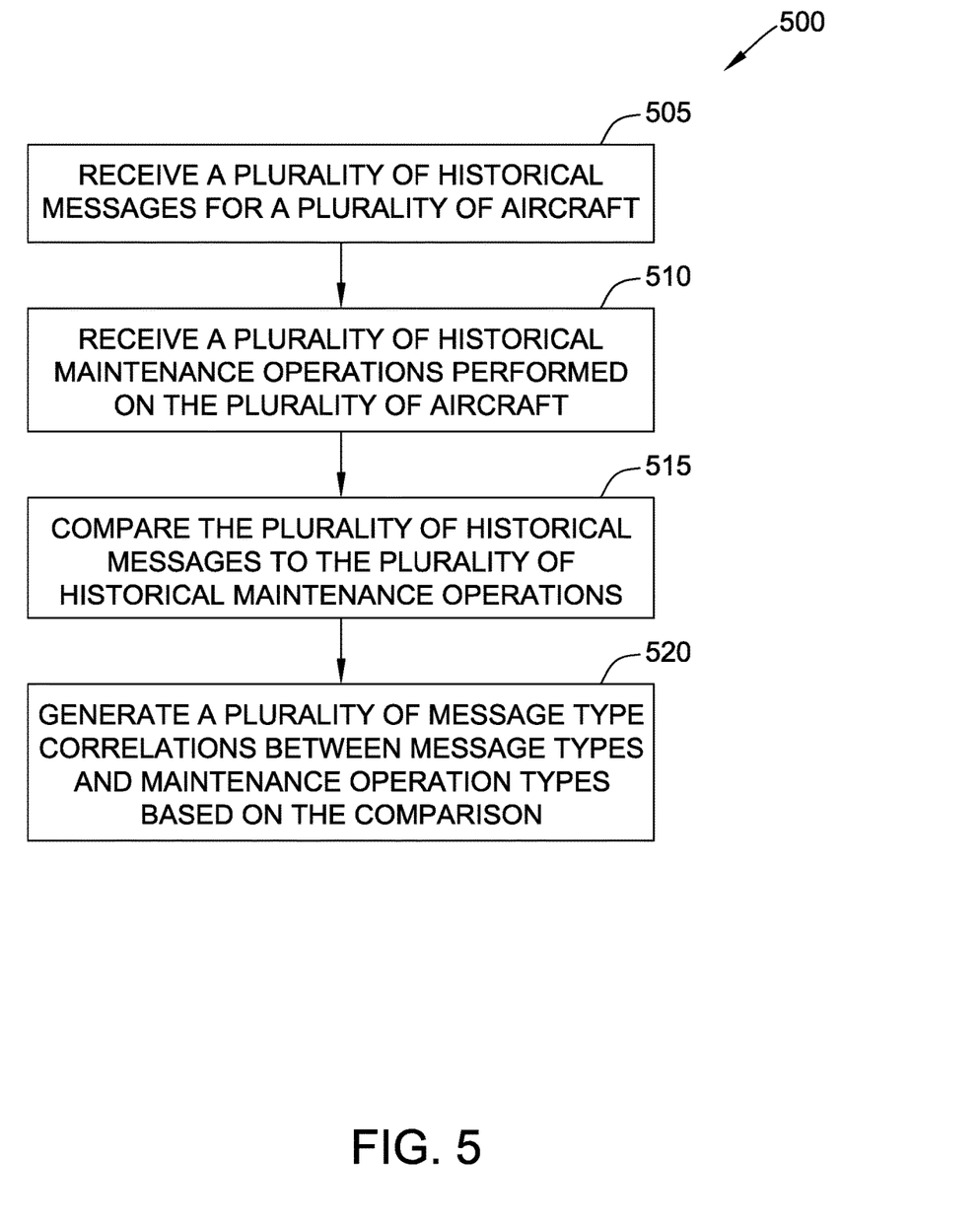
FIG. 5 is a flowchart illustrating an example of a process of determining correlations using the system shown in FIG. 2.
Figure 6:
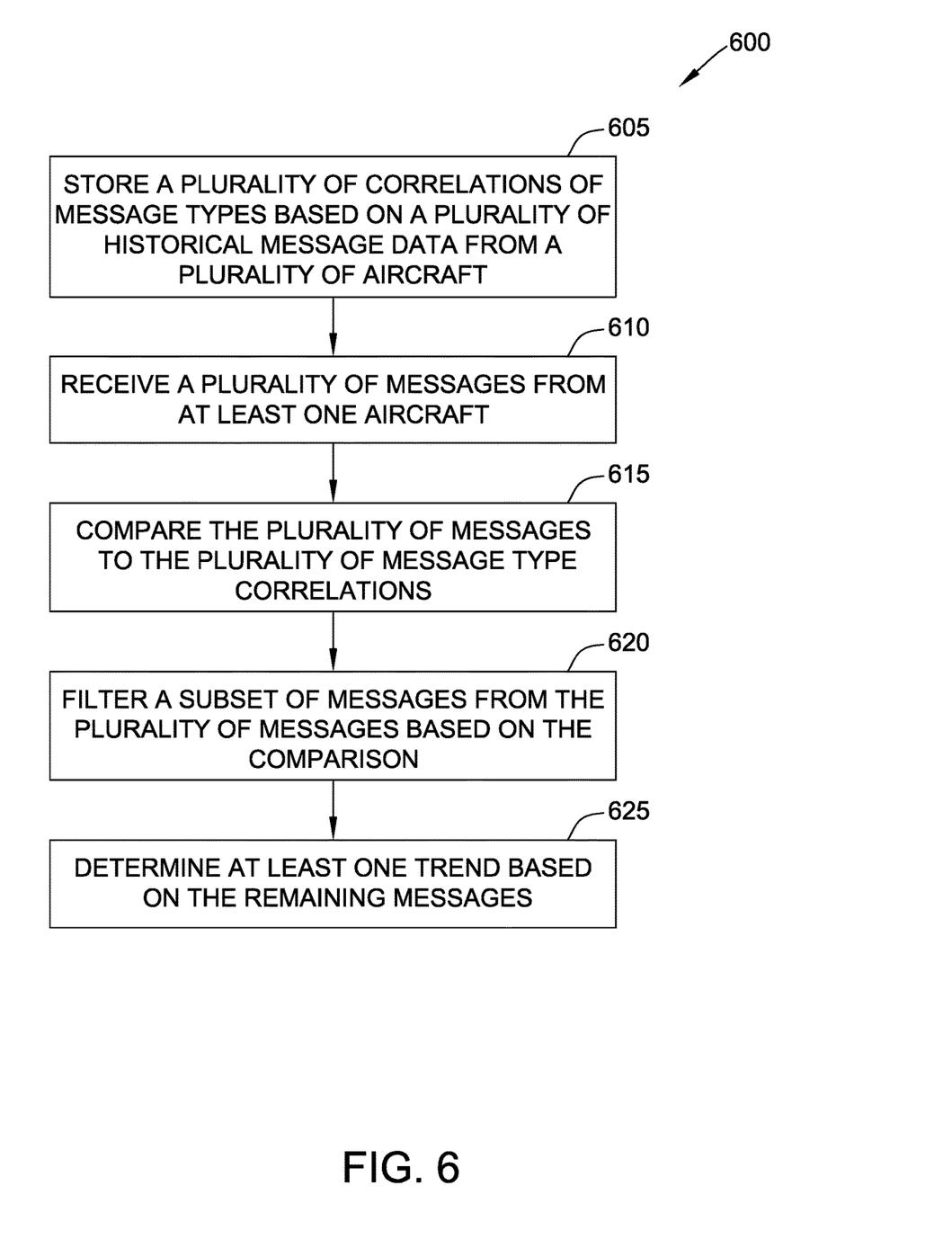
FIG. 6 is a flowchart illustrating an example of a process of monitoring aircraft operational messages of the aircraft shown in FIG. 1 using the system shown in FIG. 2.

FIG. 5 is a flowchart illustrating an example of a process 500 of determining correlations using system 200 (shown in FIG. 2). Process 500 may be implemented by a computing device, for example AMM server 210 (shown in FIG. 2).

In the example embodiment, AMM server 210 receives 505 a plurality of historical messages from a plurality of aircraft 100 (shown in FIG. 1). In the example embodiment, the plurality of historical messages are messages that have been transmitted from aircraft 100 to ground station 205 (shown in FIG. 2). In this embodiment, ground station 205 receives messages from a plurality of aircraft 100 over time. Ground station 205 stores the messages in a database 220 (shown in FIG. 2). Ground station 205 then transmits the plurality of stored messages to AMM server 210. In the some embodiments, the plurality of messages are from a plurality of aircraft 100 and the messages were generated by sensors 104 (shown in FIG. 1) in the aircraft 100 during a plurality of flights. For example, the plurality of messages may be for all flights of a particular type of aircraft for a period of a year or multiple years. The plurality of messages may be for all aircraft flights associated with an individual airline over a period of time, such as months or years.

In the example embodiment, AMM server 210 receives 510 a plurality of historical maintenance operations performed on the plurality of aircraft 100. The plurality of historical maintenance operations includes information such as when a component 102 (shown in FIG. 1) of aircraft 100 was disconnected. In the example embodiment, the historical maintenance operations map to the various aircraft whose messages are included in the plurality of historical messages. In one embodiment, AMM server 210 receives 505 a plurality of historical messages for a specific aircraft and receives 510 the historical maintenance operations that were performed on that aircraft 100. In the example embodiment, AMM server 210 receives the historical message and the historical maintenance operations for a plurality of aircraft, such as for an aircraft fleet. In some further embodiments, AMM server 210 receives additional information about each aircraft, such as, but not limited to, aircraft type, hours of operation, locations flown, and other information about the operation of the aircraft.

In the example embodiment, AMM server 210 compares 515 the plurality of historical messages with the plurality of historical maintenance operations to determine at least one message type associated with at least one maintenance operation type. For example, AMM server 210 may determine that there is a correlation between a maintenance operation to disconnect a radio and two messages. In this example, after a radio is disconnected, AMM server 210 may determine that a radio unavailable message is repeatedly sent out. AMM server 210 may also determine that a message stating that 20 Volts is not available to the radio is also repeatedly sent out.

In at least one embodiment, AMM server 210 calculates a correlation between the maintenance operation and having messages of one or more types being sent out. In some embodiments, AMM server 210 analyzes each maintenance operation type. AMM server 210 analyzes the messages that occur before and after each maintenance operation type for each of the plurality of messages. For example, if forty aircraft performed a specific type of maintenance operation, AMM server 210 compares 515 the messages that were transmitted for each of the forty aircraft before and after the maintenance operation. If there is a correlation of either a message no longer appearing after the operation or a new message that appears after the operation, then AMM server 210 calculates the correlation, the mathematical probability that there is a correlation between the maintenance operation and the change in messages. The higher the correlation, the more likely that the maintenance operation affected the messages. AMM server 210 calculates a confidence level for the correlation. For example, if there are only a few aircraft with the maintenance operation and the correlation is low, then the confidence level may be low. If the confidence level exceeds a threshold, then AMM server 210 associates the messages (or message type) with the maintenance operation.

In the example embodiment, AMM server 210 generates 520 a plurality of message type correlations, between message types and maintenance operation types. AMM server 210 stores each correlation that exceeds a confidence threshold. In the example embodiment, AMM server 210 stores the correlations in a database 220.

In some embodiments, AMM server 210 compares the aircraft type to the plurality of historical messages. In these embodiments, AMM server 210 determines if there is a correlation between a message type and an aircraft type. For example, a specific aircraft type may have a status message or other non-critical message that aircraft of its type consistently generate. In these embodiments, AMM server 210 determines a confidence level about the correlation and associates the message type with the aircraft type if the confidence level exceeds the threshold.

In some further embodiments, AMM server 210 receives a plurality of messages from a single aircraft 100. AMM server 210 analyzes the plurality of messages to determine at least one maintenance operation that has been performed on the aircraft 100 based on the plurality of messages and the plurality of message type correlations. For example, AMM server 210 may see messages of message type A and message type B and have a 99% confidence that maintenance operation type X had been performed on the aircraft 100 due to see these two message types in the plurality of messages that the aircraft 100 generated.

In some still further embodiments, AMM server 210 filters out a subset of messages from the plurality of messages, where the subset of messages are correlated to the determine maintenance operation. In the above example, AMM server 210 would remove or filter out messages of message type A and message type B from the plurality of messages from the aircraft 100. After removing the messages, AMM server 210 analyzes the remaining messages to determine at least one trend about operation of the aircraft 100. By removing the messages associated with the known maintenance operation, AMM server 210 is then able to work with a reduced message set. As the reason for those messages being generated is known, reducing the messages in the plurality of messages reduces the amount of noise and improves the accuracy of the determined trend. An example of a trend may be a correlation between one or more message types and a later component failure.

FIG. 6 is a flowchart illustrating an example of a process 600 of monitoring aircraft operational messages of aircraft 100 (shown in FIG. 1) using system 200 (shown in FIG. 2). Process 600 may be implemented by a computing device, for example AMM server 210 (shown in FIG. 2).

In the example embodiment, AMM server 210 stores 605 a plurality of message type correlations, such as the message type correlations generated in process 500, shown in FIG. 5. The plurality of message type correlations is based on a plurality of historical message data from a plurality of aircraft. In the example embodiment, AMM server 210 stores 605 the plurality of message type correlations in database 220 (shown in FIG. 2). In the example embodiment, some message type correlations correlate a maintenance operation type to one or more message types, where the message types either appear or disappear after the maintenance operation is performed on an aircraft. In the example embodiment, other message type correlation correlate an aircraft type with one or more message types, where the message types consistently are generated by aircraft of the particular aircraft type. For example, a particular aircraft type may constantly generate a printer out of paper message because the crew members generally don't load the paper.

In the example embodiment, AMM server 210 receives 610 a plurality of messages from one or more aircraft 225. In some embodiments, AMM server 210 receives 610 the messages from ground station 205 (shown in FIG. 2), where ground station 205 collected the plurality of messages. In other embodiments, AMM server 210 receives 610 the messages directly from aircraft 225.

AMM server 210 compares 615 the plurality of messages to the plurality of message type correlations. Based on the comparison, AMM server 210 filters 620 a subset of messages from the plurality of messages. For example, AMM server 210 determines one or more maintenance operations that may have occurred based on the plurality of messages. In another example, AMM server 210 determines that aircraft 225 is a specific type of aircraft and filters out unnecessary or redundant messages based on the message type correlations.

AMM server 210 determines 625 at least one trend based on the remaining message. In an exemplary embodiment, after filtering 620 out the messages based on the correlations, AMM server 210 analyzes remaining messages to determine one or more trends. These trends may include, but are not limited to, future needed maintenance operations, future equipment failures, or equipment operating lifetimes. AMM server 210 may also perform data mining on the remaining messages to provide information or insights about the data to a user.

Figure 7:
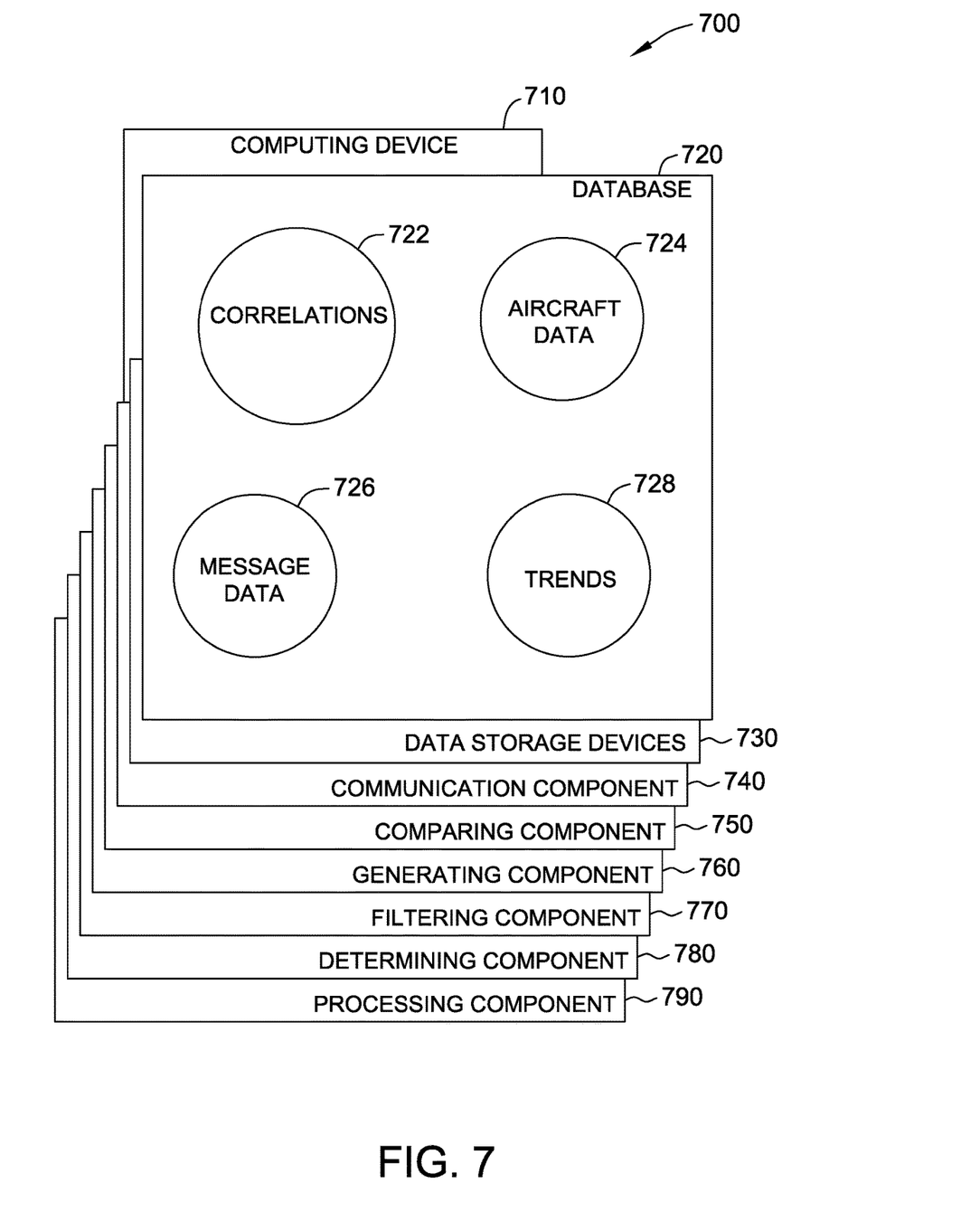
FIG. 7 is a diagram of components of one or more example computing devices that may be used in the system shown in FIG. 2.

FIG. 7 is a diagram 700 of components of one or more example computing devices that may be used in the system 200 shown in FIG. 2. In some embodiments, computing device 710 is similar to AMM server 210 (shown in FIG. 2). Database 720 may be coupled with several separate components within computing device 710, which perform specific tasks. In this embodiment, database 720 includes correlations 722, aircraft data 724, message data 726, and trends 728. In some embodiments, database 720 is similar to database 220 (shown in FIG. 2).

Computing device 710 includes the database 720, as well as data storage devices 730. Computing device 710 also includes a communication component 740 for receiving 505 a plurality of historical messages, receiving 510 a plurality of maintenance operations (both shown in FIG. 5), and receiving 610 a plurality of messages (shown in FIG. 6). Computing device 710 also includes a comparing component 750 for comparing 515 the plurality of historical messages to the plurality of historical maintenance operations (shown in FIG. 5) and comparing 615 the plurality of messages to the plurality of message type correlations (shown in FIG. 6). Computer device 710 further includes a generating component 760 for generating 520 a plurality of message type correlations (shown in FIG. 5). Moreover, computer device 710 includes a filtering component 770 for filtering 620 a subset of messages (shown in FIG. 6). In addition, computer device 710 includes a determining component 780 for determining 625 at least one trend (shown in FIG. 6). A processing component 790 assists with execution of computer-executable instructions associated with the system.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As described above, the implementations described herein relate to systems and methods for monitoring aircraft operational messages, and, more specifically, to determining the relevancy of aircraft operational messages to the safe operation of an aircraft. More specifically, an aircraft message monitor ("AMM") computer device collates historical message traffic to determine correlations between message types and other non-mission critical factors, such as when not all of the components of the aircraft are in operation, but the aircraft still meets the required minimum equipment list. The AMM computer device uses those correlations to filter out the non-mission critical messages to improve the analysis of the remaining messages.

The above-described methods and systems for aircraft operational message monitoring are cost-effective, secure, and highly reliable. The methods and systems include automatically determining and removing non-mission critical messages, greatly increasing the accuracy of trending analysis, and greatly increasing the relevancy of message analysis. Accordingly, the methods and systems facilitate improving the diagnosis and safe operation of aircraft in a cost-effective and reliable manner.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring aircraft operational messages, said system comprising:
   a computing device comprising a processor in communication with a memory, wherein said computing device is programmed to:
      receive a plurality of historical messages generated by a plurality of aircraft, wherein each message of the plurality of historical messages is a message generated by a sensor aboard one of the plurality of aircraft;
      receive a plurality of historical maintenance operations performed on the plurality of aircraft;
      compare the plurality of historical messages to the plurality of historical maintenance operations to determine at least one message type associated with at least one maintenance operation type;
      generate a plurality of message type correlations between message types and maintenance operation types based on the comparison by performing the steps of:
         determining a confidence level for a correlation between a maintenance operation type and a message type;
         determining when the confidence level exceeds a threshold; and
         associating the message type with the maintenance operation type as a correlation when the confidence level exceeds the threshold;
      automatically remove messages from the plurality of historical messages associated with one of the plurality of historical maintenance operations based on the plurality of message type correlations; and
      determine at least one trend about operation of the aircraft based on the remaining messages.

2. The system in accordance with claim 1, wherein the at least one maintenance operation type is a disconnection of a piece of aircraft equipment.

3. The system in accordance with claim 1, wherein said processor is further programmed to:
   determine a confidence level for a correlation between a message type and an aircraft type;
   determine when the confidence level exceeds a threshold; and
   associate the message type with the aircraft type as a correlation when the confidence level exceeds the threshold.

4. The system in accordance with claim 1, wherein said processor is further programmed to:
   receive a plurality of messages from an aircraft; and
   determine at least one maintenance operation performed based on the plurality of messages and the plurality of message type correlations.

5. The system in accordance with claim 4, wherein said processor is further programmed to determine a type of the aircraft based on the plurality of messages and the plurality of message type correlations.

6. The system in accordance with claim 1, wherein the plurality of historical messages includes operational messages for each of the plurality of aircraft for a period of time.

7. A aircraft message monitor (AMM) computer device for monitoring aircraft operational messages, said AMM computer device comprising a processor in communication with a memory, said processor programmed to:
   receive a plurality of historical messages generated by a plurality of aircraft, wherein each message of the plurality of historical messages is a message generated by a sensor aboard one of the plurality of aircraft;
   receive a plurality of historical maintenance operations performed on the plurality of aircraft;
   compare the plurality of historical messages to the plurality of historical maintenance operations to determine at least one message type associated with at least one maintenance operation type;
   generate a plurality of message type correlations between message types and maintenance operation types based on the comparison by performing the steps of:
      determining a confidence level for a correlation between a maintenance operation type and a message type;
      determining when the confidence level exceeds a threshold; and associating the message type with the maintenance operation type as a correlation when the confidence level exceeds the threshold;
automatically remove messages from the plurality of historical messages associated with one of the plurality of historical maintenance operations based on the plurality of message type correlations; and
determine at least one trend about operation of the aircraft based on the remaining messages.

8. The AMM computer device in accordance with claim 7, wherein the at least one maintenance operation type is a disconnection of a piece of aircraft equipment.

9. The AMM computer device in accordance with claim 7, wherein the processor is further programmed to:
determine a confidence level for a correlation between a message type and an aircraft type;
determine when the confidence level exceeds a threshold; and
associate the message type with the aircraft type as a correlation when the confidence level exceeds the threshold.

10. The AMM computer device in accordance with claim 7, wherein the processor is further programmed to:
receive a plurality of messages from an aircraft; and
determine at least one maintenance operation performed based on the plurality of messages and the plurality of message type correlations.

11. The AMM computer device in accordance with claim 10, wherein the processor is further programmed to determine a type of the aircraft based on the plurality of messages and the plurality of message type correlations.

12. The AMM computer device in accordance with claim 7, wherein the plurality of historical messages includes operational messages for each of the plurality of aircraft for a period of time.

13. A system for monitoring aircraft operational messages, said system comprising:
a computing device comprising a processor in communication with a memory, wherein said computing device is programmed to:
store a plurality of correlations of message types based on a plurality of historical message data from a plurality of aircraft, wherein each message of the plurality of historical messages is a message generated by a sensor aboard one of the plurality of aircraft, and wherein the plurality of correlations are based on message types associated with a plurality of maintenance operations, and wherein the plurality of correlations are based on comparisons of message types and the plurality of maintenance operations;
receive a plurality of messages from at least one aircraft;
compare the plurality of messages to the plurality of correlations;
determine a confidence level for a correlation between a maintenance operation type and a message type;
determine when the confidence level exceeds a threshold;
associate the message type with the maintenance operation type as a correlation when the confidence level exceeds the threshold;
automatically remove messages from the plurality of messages associated with one of the plurality of maintenance operations based on the comparison; and
determine at least one trend based on the remaining messages.

14. The system in accordance with claim 13, wherein the plurality of correlations are based on a correlation between at least one of an aircraft type and a maintenance operation type.

15. The system in accordance with claim 14, wherein the maintenance operation type is a disconnection of a piece of aircraft equipment.

16. The system in accordance with claim 14, wherein said processor is further programmed to determine a type of the at least one aircraft based on the plurality of messages and the plurality of correlations.

17. The system in accordance with claim 13, wherein said processor is further programmed to determine at least one maintenance operation performed on the at least one aircraft based on the plurality of messages and the plurality of correlations.

18. The system in accordance with claim 13 wherein said processor is further programmed to:
receive a plurality of historical messages for a plurality of aircraft, wherein each message of the plurality of historical messages is a message from one of the plurality of aircraft;
receive a plurality of historical maintenance operations performed on the plurality of aircraft;
compare the plurality of historical messages to the plurality of historical maintenance operations to determine at least one message type associated with at least one maintenance operation type; and
generate the plurality of correlations between message types and maintenance operation types based on the comparison.

19. The system in accordance with claim 18, wherein said processor is further programmed to:
receive a plurality of aircraft information for the plurality of aircraft including aircraft type for each of the plurality of aircraft;
compare the plurality of historical messages to the plurality of aircraft information to determine at least one message type associated with at least one aircraft type; and
generate the plurality of correlations between message types and aircraft types based on the comparison.

20. The system in accordance with claim 13, the plurality of historical message data includes operational messages for each of the plurality of aircraft for a period of time.

* * * * *